Jan. 19, 1965

R. THEISEN ETAL 3,166,670

SPECIMEN ANALYZING SYSTEM FOR USE WITH
AN ELECTRON PROBE MICROANALYZER

Filed Sept. 19, 1962

United States Patent Office 3,166,670
Patented Jan. 19, 1965

3,166,670
SPECIMEN ANALYZING SYSTEM FOR USE WITH AN ELECTRON PROBE MICROANALYZER
Roger Theisen, Brussels, Belgium, and Jacques Lemaitre, Cocquio, Andrea, Italy, assignors to The Communaute Europeenne de l'Energie Atomique International Organization, Brussels, Belgium
Filed Sept. 19, 1962, Ser. No. 224,769
Claims priority, application Belgium, Sept. 29, 1961, 485,104
4 Claims. (Cl. 250—49.5)

The present invention has for its object a device which permits of the practical application of a combined method of analysis by X-ray spectrography and electron diffraction on plates having a thickness which is either less than or equal to one micron, and also relates to the differen processes for the utilization of this method. To be more precise, the device in accordance with the invention is an improved sample-holding apparatus by means of which a number of advantages hitherto impossible to apply in practice can be gained from the so-called "electron micro-probe" technique as defined by M. Castaing ("O.N.E.R.A." technical publication, 1952).

An electron micro-probe of this type is an apparatus which projects an extremely fine electron beam—namely, which has a cross-section of the order of one square micron—on to a sample to be analyzed. The sample then emits X-rays, the intensity of which can be measured by means of a Geiger-Müller counter, proportional counter or scintillation counter as a part of a curved-crystal spectrometer.

By means of the comparison of the counts effected on the one hand in respect of the sample being studied and on the other hand in respect of a reference piece, it is possible to calculate the composition (for example, the percentage of a given metal contained in an alloy) of the sample which is being studied.

By virtue of the high resolving power of micro-probes at present available in commerce, it is possible to analyze both qualitatively and quantitatively in metallic samples a volume of the order of one cubic micron ($10^{-12}$ cm.$^3$). However, two main sources of error must be taken into account: on the one hand, the mass absorption of X-rays in the anti-cathode or target (reference pieces and sample) and, on the other hand, secondary radiation by fluorescence.

It has been endeavoured to provide a remedy for these disadvantages in two ways: first by comparison with reference pieces of known chemical composition; and then by calculation of corrections determined by means of approximation formulae or semi-empirical formulae.

It can be understood, however, that it is extremely delicate to prepare accurate and uniform reference pieces on the scale of one cubic micron; as regards the corrections which are effected, they tend to prove rather unreliable (in certain unfavourable cases, differences of over 30% are obtained between true values and measured values) and are often very complex.

The present invention is directed to the design of an apparatus which avoids the above-mentioned corrections and provides the possibility, by means of an electron micro-probe, of carrying out microanalyses with greater accuracy as well as measurements which have hitherto been impracticable.

A specimen holder assembly in accordance with the invention is essentially characterized in that it comprises in combination a base-plate provided with slideway and stop permitting of accurate mechanical positioning, an insulating plate of a dielectric material and a metallic mounting plate designed to carry an electron trap, a number of thimbles containing samples or massive reference pieces and a number of sample-carrying sub-assemblies.

Each sample-carrying sub-assembly is made up of a flexible non-magnetic blade which is mounted on a set-screw, said flexible blade being rigidly held in position at one end thereof, while the other end thereof, which is pierced with a conical hole having a very wide flare at the top, forces the sample against a grid carried by a metallic tube which is fitted inside the mounting plate.

The base-plate and the insulating plate of dielectric material are open in the central portion thereof along a surface which extends beneath the sample-carrying sub-assemblies.

The specimen holder assembly as described above serves for the practical application of a number of processes which in certain cases are already known, at least in their general principles, such as local electron microdiffraction by thin-film transparency, but which are practically impossible to carry out in a microanalyzer of conventional type. Entirely new methods of analysis are furthermore made possible by means of this assembly, and in particular the following:

One method of local analysis which consists in making a spectrographic study of X-ray emission by comparing thin samples with thin reference pieces placed on the same sample-holder on the one hand, and by calculating the absorption and fluorescence corrections with reference to the samples and to the corresponding massive reference pieces on the other hand. The comparative analysis of one point of the massive reference piece and the corresponding point of the thin sample is made possible with the maximum reliability by virtue of the ultra-microtomy technique: the thin sample is detached from the massive sample and as a result the two samples have an identical surface area which corresponds to the cutting plane. The points analyzed on the two surfaces which thus have an identical metallographic appearance can then be readily located.

Another method of electron measurement which is made possible by means of the specimen holder assembly in accordance with the invention consists in measuring the absorption of electrons in a sample by taking measurements on the one hand of the electronic current which is absorbed in a thin reference strip and in a massive reference piece of the same nature and, on the other hand, of the current which is transmitted through said strip and, lastly, of the total probe current which is supplied to the electron trap. The determination of these parameters permits the calculations of correction with respect to the microanalysis of massive samples.

Finally, another method of analysis in accordance with the invention consists in determining the specific absorption of a substance by comparing the electronic current absorbed in a thin sample or a massive sample with the current absorbed in a thin reference sample or a massive reference sample.

One form of construction of the device in accordance with the invention will be described below by way of example without any limitation being implied, reference being made to the accompanying drawings, in which.

Figure 1:
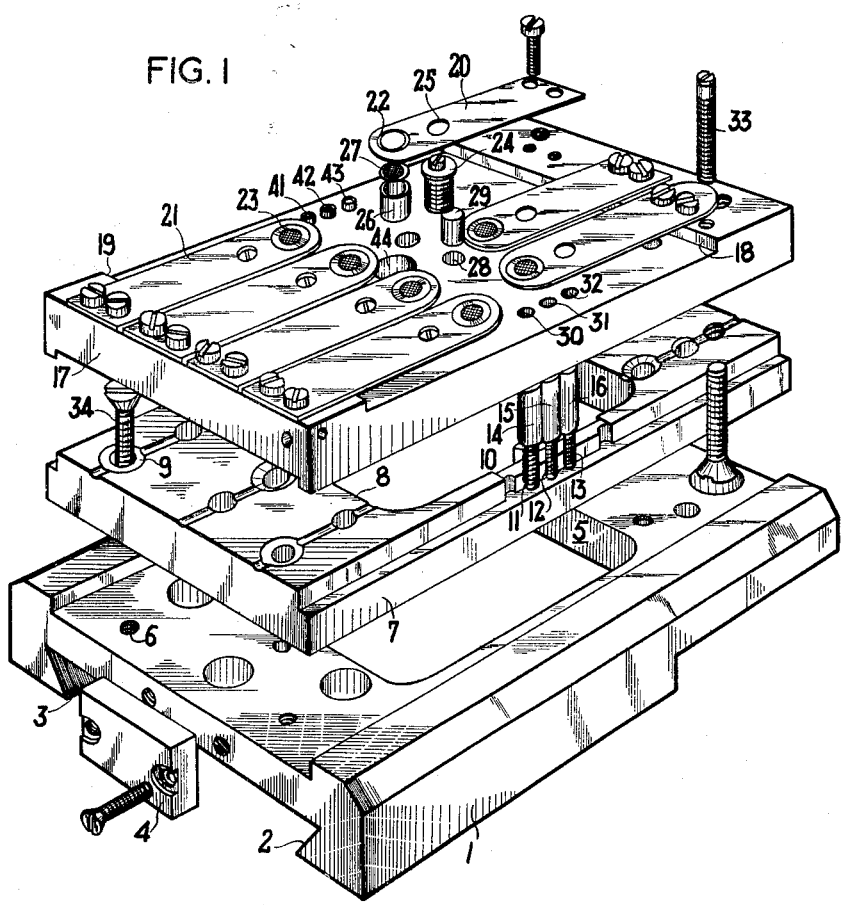
FIG. 1 is an exploded view in perspective of a specimen holder assembly in accordance with the invention.

FIG. 1 shows the specimen holder assembly which is constituted by a metallic base-plate 1 or frame having a generally rectangular shape and provided with two longitudinal slideways 2 and 3 of dovetail shape, and a removable stop 4. A substantially square opening 5 is formed in the central portion of the base-plate 1, this latter being pierced with a certain number of holes such as the hole 6 which are intended for securing of other components of the apparatus.

There is arranged above the base-plate 1 an insulating plate 7 which is also of generally rectangular shape and which is hollowed-out in the central portion thereof at 8. In the same manner as the base-plate, the plate 7 is pierced with fixation holes such as the hole 9. In addition, there is formed on each side of the said plate 7, inside a projection such as the projection 10, three housings 11, 12, 13 which are intended to carry small cylindrical thimbles 14, 15 and 16 on one side of said plate and 41, 42, 43 on the other side thereof.

Above the insulating plate 7, there is arranged a metallic plate 17 having two transverse upright edges 18 and 19, the surfaces of which coincide with the focussing plane of an electron micro-probe (which has not been illustrated in the drawings) and on which are fixed seven flexible blades such as the blades 20 and 21 of a non-magnetic material such as bronze or beryllium, for example. Each blade is machined at the end opposite to the raised edge on which said blade is fixed, so as to form a conical hole 22 or 23 having a very wide flare at the top; in addition, to form a specimen-holder proper, each blade is associated on the one hand with a set-screw such as the set-screw 24, the base of which is fitted inside the mounting plate 17 and the top of which is fitted inside a hole 25 which is pierced in the central portion of the blade and, on the other hand, with a grid-holding tube 26 which is also fitted into the mounting plate and with a grid 27 which rests on the grid-holder 26.

The thin samples and/or thin reference pieces are then placed in position between each grid 27 and the hole 22 of the corresponding blade 20.

The mounting plate is also provided with a hole 28 which is intended to receive an electron trap 29 as well as three holes formed in each side of said mounting-plate such as the holes 30, 31 and 32 which receive the thimbles 14, 15, 16 and 41, 42, 43 which are designed to contain the massive reference pieces. The mounting plate is provided in addition with a central hole 44 which provides a passageway for the electron beam of the micro-probe so as to effect the centering of said beam. Finally, the three main parts consisting of the base-plate 1, the insulating plate 7 and the mounting plate 17 are secured in position and clamped together by means of screws such as the screw 34 while the insulation of said plates is maintained by virtue of their special arrangement. A contact screw 33 permits the mounting plate 17 to be rapidly connected to the base-plate 1 which is in turn connected to earth (ground).

The external dimensions of this apparatus are approximately 5 centimeters in length, 4 centimeters in width and 1 centimeter in height.

Among the advantages provided by means of the particular arrangement of the assembly described above, stress should be laid especially on the following points:

The most effective arrangement of a number of thin blades and massive samples as well as a Faraday micro-cylinder or electron trap;

The geometric arrangements of the different components of the apparatus which make it possible to take physical measurements while eliminating all the obstacles which can be present on the one hand on the path of the X-rays between their point of emission and the spectrometer and, on the other hand, on the path of the electrons transmitted between their point of emergence and either the Faraday cylinder of the micro-probe or the photographic plate employed in the micro-diffraction process.

The composite construction of the device (conductive components and insulating components) which permits of a good electrical contact between each sample and the mounting plate, the insulation of said mounting plate, and the return of the current to earth (ground) which takes place at will either through a galvanometer which is connected into the circuit or directly.

Finally, the very special positioning of the thin strips in the focussing plane which is achieved as a result of the application of said strips against the top ring of a supporting cylinder by means of a flexible and non-magnetic blade, said blade being pierced with a conical hole having a very wide flare which provides the sample with substantial clearance and permits the grazing X-rays to pass.

Interchangeability is achieved by the use of standard grids employed in electron microscopy; changing the object is effected very easily since it is merely necessary to lift the sample-holder blade with the aid of the set-screw in order to free the supporting grid.

Figure 2:
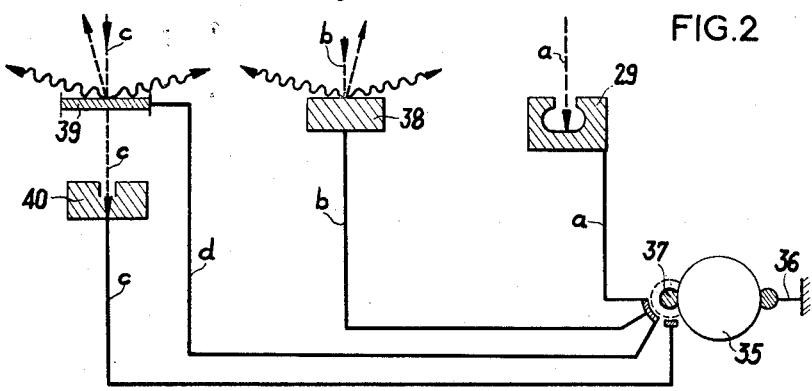
FIG. 2 is a general arrangement diagram of the specimen holder assembly for the practical operation in accordance with the invention, of the method of analysis by electron absorption.

Reference being made to FIG. 2, circuitory will be described below which includes the above-mentioned assembly and by means of which it is possible to perform a method of measurement of electron absorption.

There is again shown in this figure the electron trap 29 which is connected to a galvanometer 35, the other terminal 36 of which is connected to earth (ground) through a change-over switch 37. There can also be seen in this figure the massive samples 38 which are contained in the thimbles 14, 15, 16 and 41, 42, 43 and one of the thin sample strips 39 which are tightly forced against the grids 27. There is located beneath said strip 39 a Faraday cylinder 40 which is disposed in retractable manner beneath the openings 5 and 8 which are hollowed-out respectively in the base-plate 1 and in the plate 7 (as shown in FIG. 1).

The following measurements can be taken by means of the change-over switch 37: circuit $aa$, full electronic current of the probe in the focussing plane; circuit $bb$, electronic current absorbed by the massive sample 38; circuit $ccc$, current of electrons which have traversed thin strip 39; circuit $cd$, electronic current absorbed by the thin strip 39.

In said FIGURE 2, the broken lines represent electron beams and the wavy lines represent X-radiations.

What we claim is:

1. A specimen holder assembly for electron microprobe including a galvanometer comprising a base plate, a slide way and a stop on said base plate for accurate mechanical positioning of said plate, an insulating plate of a dielectric material mounted on said base plate, a metallic mounting plate mounted on said insulating plate, a first electron trap carried by said mounting plate selectively connected to the galvanometer for measuring the electron current, thimbles containing massive reference pieces mounted in said mounting plate and selectively connected to the galvanometer for measuring electron absorption of the reference pieces and a plurality of sample carrying subassemblies mounted on said mounting plate and selectively connected to the galvanometer for measuring the electron current absorbed by the samples and a second electron trap beneath each of the samples selectively connected to the galvanometer for measuring the electron current passing through the sample.

2. An assembly as described in claim 1, each of said subassemblies including a non-magnetic flexible blade rigidly held in position at one end thereof to said mounting plate, a set screw for adjusting the position of said blade mounted between said blade and said mounting plate, a conical recess having a very wide flare at the top in the other end of said blade, a metallic tube fitted in said mounting plate beneath said recess, a grid on said tube and a sample between said grid and said recess held in position by said blade.

3. An assembly as described in claim 1, said base plate and said insulating plate being apertured centrally beneath said sample carrying subassemblies.

4. An assembly as described in claim 1, said metallic mounting plate having a central aperture for passage of the electron beam of the micro probe.

References Cited by the Examiner

UNITED STATES PATENTS

| | | | |
|---|---|---|---|
| 2,264,725 | 12/41 | Shoupp et al. | 250—83.4 |
| 2,421,696 | 6/47 | Hillier | 250—49.5 |
| 2,848,624 | 8/58 | Friedman et al. | 250—51.5 |
| 2,952,776 | 9/60 | Schumacher et al. | 250—83.4 |
| 2,968,723 | 1/61 | Steigerwald | 250—49.5 |
| 2,977,478 | 3/61 | Wuppermann | 250—51.5 |
| 3,054,896 | 9/62 | Jones et al. | 250—49.5 |
| 3,080,481 | 3/63 | Robinson | 250—49.5 |
| 3,103,584 | 9/63 | Shapiro et al. | 250—49.5 |

FOREIGN PATENTS

| | | |
|---|---|---|
| 876,297 | 11/42 | France. |
| 1,058,166 | 5/59 | Germany. |

RALPH G. NILSON, *Primary Examiner.*